United States Patent [19]

Satoh

[11] Patent Number: 5,274,462
[45] Date of Patent: Dec. 28, 1993

[54] IMAGE INPUT AND OUTPUT METHOD

[75] Inventor: Takaaki Satoh, Kyoto, Japan

[73] Assignee: Murata Kikai Kabushiki Kaisha, Kyoto, Japan

[21] Appl. No.: 668,623

[22] Filed: Mar. 13, 1991

[30] Foreign Application Priority Data

Mar. 15, 1990 [JP] Japan ................................ 2-64635

[51] Int. Cl.⁵ .............................................. H04N 1/41
[52] U.S. Cl. ..................................... 358/428; 358/430
[58] Field of Search ............... 358/428, 430, 426, 431, 358/261.1, 261.2, 261.3, 261.4, 262.1; 382/54, 55

[56] References Cited

U.S. PATENT DOCUMENTS 3,974,325  8/1976  Wilmer ............................ 358/428
4,291,339  9/1981  Ogawa et al. .................... 358/428
4,303,947  12/1981  Stoffel ............................. 358/428

Primary Examiner—Edward L. Coles, Sr.
Assistant Examiner—Jerome Grant, II
Attorney, Agent, or Firm—Spensley Horn Jubas & Jubas

[57] ABSTRACT

A image input/output method for reading fine input data without increasing the amount of information and for reproducing fine image data from the input data. Data is extracted from every nth pixel in a line of pixels. The extraction process is repeated for n lines of pixels while sequentially changing the phase of the pixels from which data is extracted for each of the n lines. A single data line is formed by combining the pixel data extracted from the n lines of pixels.

5 Claims, 3 Drawing Sheets

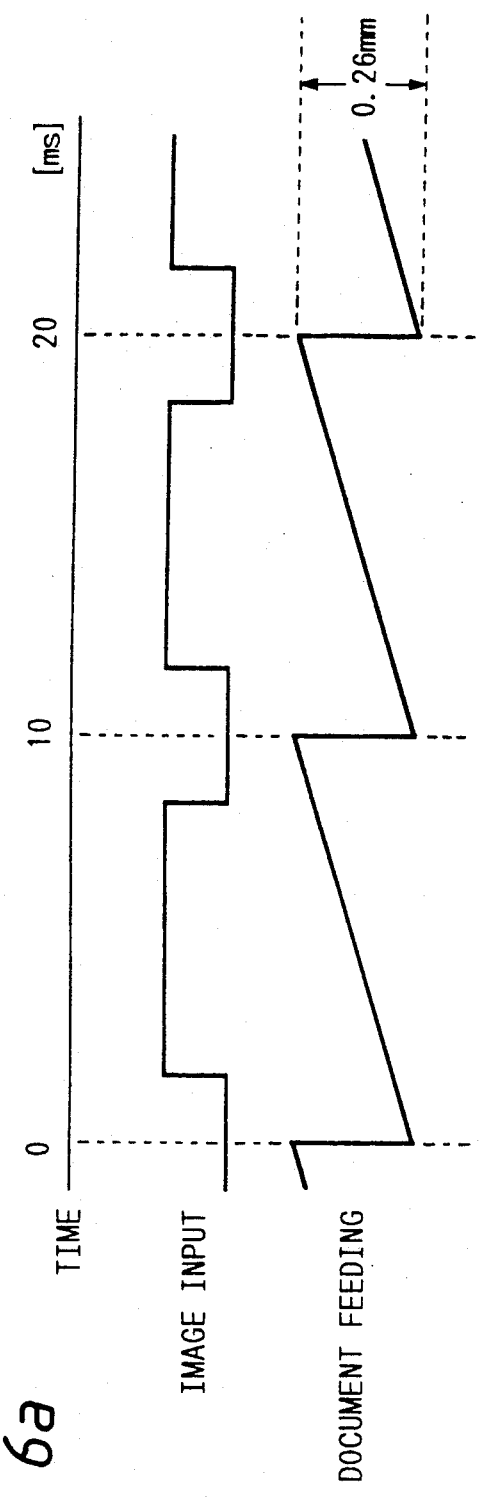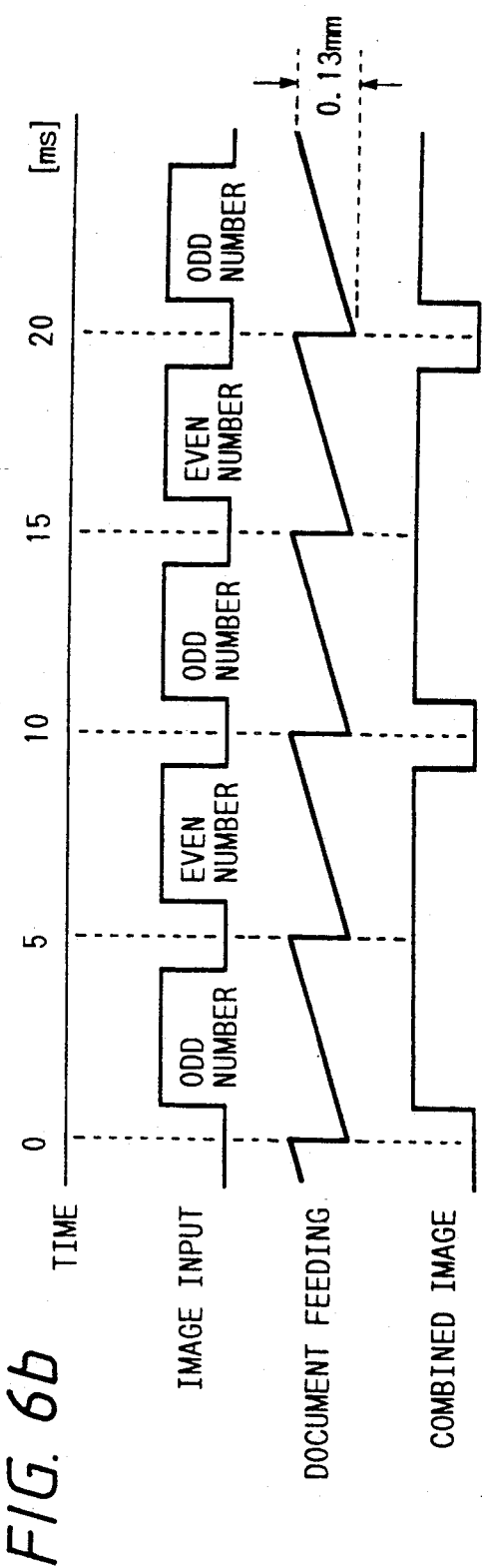

IMAGE INPUT AND OUTPUT METHOD

FIELD OF THE INVENTION

The present invention relates to an image input/output method utilizing a scanner, and in particular a scanner of the type used in facsimile machines.

RELATED ART STATEMENT

Conventional image input methods for reading images with a scanner present a problem in that some ruled lines that are parallel to the main scanning direction cannot be read.

Explanation will be made with reference to the scanner of a facsimile machine as an example. Referring to FIG. 3a, since the pitch between reading lines in a "normal" scanning mode is 0.26 mm, if a horizontal line 31 having a thickness of between approximately 0.10 and 0.20 mm does not fall on the reading line 32, then the horizontal line 31 cannot be read.

Referring to FIG. 3b, if scanning is carried out at a pitch of 0.13 mm in a "fine" scanning mode, then it is possible to read the horizontal line 31 which could not be read in the normal mode. However, this results in a problem in that the amount of information increases and the transmission time also increases.

Therefore, it has been suggested that the data of two of the reading lines in FIG. 3b be used to obtain a logical OR. In other words, it has been suggested that two readings be made at a pitch of 0.13 mm to obtain a logical OR. This eliminates the problem of an increase in the amount of information. However, as shown in FIG. 3c, since the printing pitch on the receiving side is 0.13 mm, the same data can be obtained for two adjacent lines on the receiving side, in spite of the fact that the data was read at a pitch of 0.13 mm in a "fine" mode on the sending side. Accordingly, there arises a problem in that the printing on the receiving side is made with an effective pitch of 0.26 mm, and the maximum effective resolution in the subscanning direction is only 0.26 mm.

OBJECT AND SUMMARY OF THE INVENTION

It is an object of the present invention to provide an image input/output method which enables fine input data to be read without increasing the amount of information, and which enables the reproduction of fine image data from the input data.

In a preferred embodiment, the invention comprises an image input method comprising the steps of extracting data from every nth pixel in a line of pixels, repeating the extraction process for n lines of pixels while sequentially changing the phase of the pixels from which data is extracted for each of the n lines, and forming a single data line by combining the pixel data extracted from the n lines of pixels. The invention further comprises an image output method comprising the steps of forming the pixel data of n lines by sequentially extracting, through a change of phase, the nth data among the pixel data in a line and forming the data of a line through the combination of pixels of n lines by sequentially changing the phase of the pixels extracted from each line and executing an interpolation processing to the pixels remaining in each line.

It is also possible to alternately read the pixels of even numbers and odd numbers in line by line by setting a value of n equal to 2.

BRIEF DESCRIPTION OF THE DRAWINGS

FIGS. 3a through 6b are diagrams for explaining the operation of a method in accordance with the present invention.

DETAILED DESCRIPTION OF PREFERRED EMBODIMENT

The following description is directed to an embodiment of the invention in which n is equal to 2.

Figure 4A:
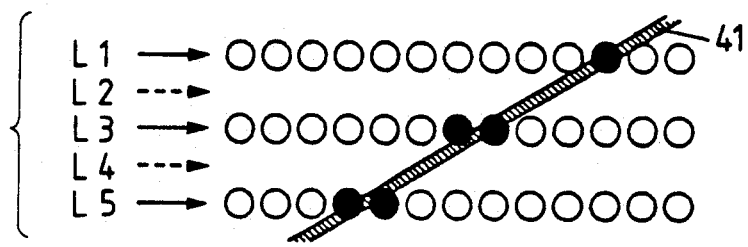
Figure 4B:
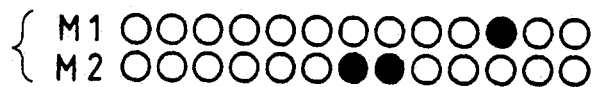

FIG. 4(a-c) shows an example of a conventional case in which data reading is carried out with a reading pitch of 0.26 mm. For convenience of explanation, the lines to be scanned that have a pitch of 0.13 mm are sequentially identified by numbers starting from L1. Thus, when the reading pitch is set to 0.26 mm, the lines identified by the odd numbers L1, L3, L5, etc. are read, as shown in FIG. 4a. For an image formed by an oblique line 41, the pixels indicated by the black circles are set to a binary level 1, and the transmitted data lines M1, M2, etc. corresponding to the readout lines L1, L3, etc. are obtained, as shown in FIG. 4b.

Figure 4C:
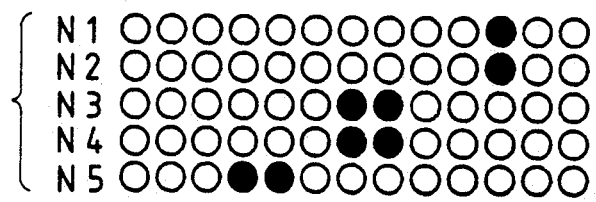

On the receiving side, since printing is carried out with a printing pitch of 0.13 mm, two identical printout lines are printed for every single transmitted data line M1, M2, etc. received. Therefore, as shown in FIG. 4c, every two adjacent printout lines N1 and N2, N3 and N4, etc. respectively provide the same print output, and the resolution in the subscanning direction has an effective pitch of 0.26 mm. In this case, image quality is far from excellent.

Figure 5A:
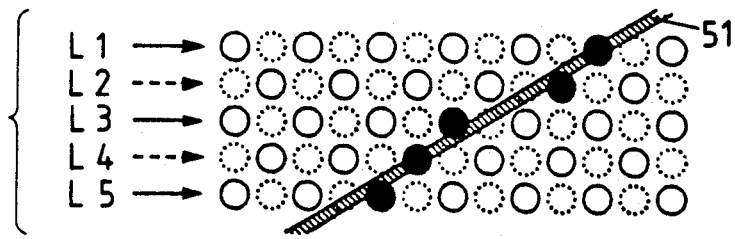

A preferred embodiment of the present invention will be explained with reference to FIG. 5(a-c). As shown in FIG. 5, the reading operation for each readout line L1, L2, L3 etc. is carried out in what may be characterized as an alternating or zig-zag pattern. In other words, as shown in FIG. 5a, in the odd numbered readout lines L1, L3, L5, etc. data is extracted only from the odd numbered pixels, whereas in the even numbered readout lines L2, L4, etc. data is extracted only from the even numbered pixels. Thus, no data is extracted from the pixels indicated by the dotted lines in FIG. 5a.

Figure 5B:
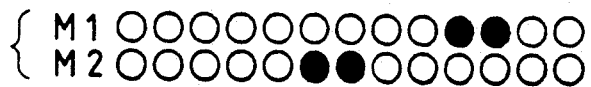

For the image of an oblique line 51, the pixels indicated by the black circles are set at a binary level 1. In each readout line, the pixels are read and the pixel data extracted as explained above. The extracted data are combined for every two readout lines. Therefore, as shown in FIG. 5b, the data extracted from the readout lines L1 and L2 are combined to form a single transmitted data line M1, while the data extracted from the readout lines L3 and L4 are combined to form a single transmitted data line M2. Therefore, although the number of readout lines in FIG. 5a is twice the number of readout lines as in FIG. 4a, the number of transmitted data lines in FIG. 5b is equal to the number of transmitted data lines in FIG. 4b. Consequently, using the method illustrated in FIG. 5, there is no increase in the number of data lines being transmitted.

Figure 5C:
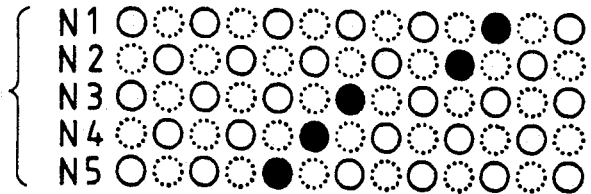

On the receiving side, the received data are extracted or decomposed for each transmitted data line by identifying and selecting data corresponding to the odd numbered readout lines and the even numbered readout lines. As shown in FIG. 5c, the decomposed data are generated from the transmitted data lines such that the odd numbered printout line N1 is obtained by extracting the odd numbered pixels from the transmitted data line M1, and the even numbered printout line N2 is obtained by extracting the even numbered pixels from the transmitted data line M1.

In FIG. 5c the pixels indicated by the dotted lines do not contain data. Therefore, the pixels indicated by the dotted lines may be interpolated based upon peripheral data. Interpolation may be carried out, for example, on the basis of data appearing in the four peripheral pixels surrounding a pixel having no data. Interpolation may be carried out on the basis of data appearing in the pixels on either side of a pixel having no data. A finer image than that in the prior art can be obtained by printing out the interpolated data.

In a facsimile device, an image input method in accordance with the present invention may be applied on the transmitting side. However, it will be recognized that images can be reproduced on the receiving side by an ordinary facsimile apparatus printing the transmitted data of FIG. 5b, without necessarily using an image output method in accordance with the present invention. The quality of the image thereby produced does not differ substantially from that of the prior art. In this respect, a method in accordance with the present invention is compatible with prior art facsimile devices.

In the above described example, the value of n was chosen to be equal to 2. However, it will be recognized that a method in accordance with the present invention can be applied to a case in which n is equal to 3 or a higher number. For example, if n is chosen to be equal to 3, then the readout pitch would be set to ⅓ of the standard pitch.

The readout timing of the image input will now be explained with reference to FIGS. 6a and 6b.

FIG. 6a illustrates an image input method in accordance with the prior art, as explained above. In the illustrated prior art method, the document is fed at a pitch of 0.26 mm every 10 ms.

FIG. 6b shows a time chart of a method in accordance with an embodiment of the present invention. In the illustrated embodiment, the document is fed at a pitch of 0.13 mm every 5 ms, which is a half of the conventional pitch. The even numbered pixels in the even numbered lines and the odd numbered pixels in the odd numbered lines are alternately read every 5 ms. Therefore, two lines (one odd, one even) are read every 10 ms, and the data from both odd and even lines are combined in the subsequent 10 ms period to form the data of one transmitted data line.

Figure 1:
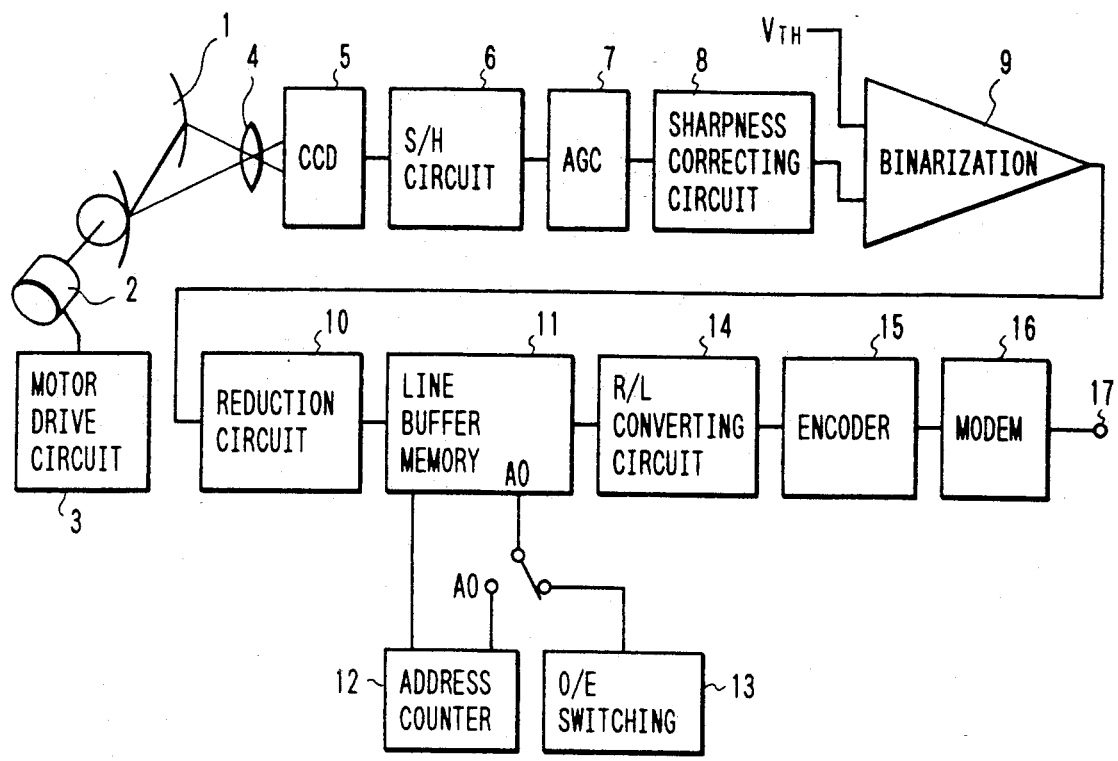
FIG. 1 shows a schematic structural diagram for explaining an embodiment of a facsimile apparatus to which an image input method of the present invention is applied.

FIG. 1 shows a schematic structure for explaining an embodiment of a facsimile apparatus to which the image input method of the present invention may be applied. In FIG. 1 the numeral 1 denotes a document to be transmitted; 2 denotes a transmitting motor; 3 denotes a motor drive circuit; 4 denotes a projection lens; 5 denotes a CCD; 6 denotes a sample and hold circuit; 7 denotes a AGC circuit; 8 denotes a shading correction circuit; 9 denotes a binarizing circuit; 10 denotes a reduction circuit; 11 denotes a line buffer memory; 12 denotes an address counter; 13 denotes an O/E switching signal generating circuit; 14 denotes a run length converting circuit; 15 denotes an encoder; 16 denotes a modem; 17 denotes a line.

The document 1 to be transmitted is moved in the subscanning direction by a transmitting motor 2 controlled by a motor drive circuit 3. An image on the document 1 is irradiated by a lighting device (not illustrated), focused by the projection lens 4 onto the CCD 5, and converted to an electrical signal. The output of the CCD 5 is transmitted as data for each pixel based on a synchronous signal by the sample and hold circuit 6. The signal voltage thus obtained, corresponding to the concentration of each pixel, is amplitude-adjusted by the AGC circuit 8 for discrimination from background and converted to binary information using the threshold voltage VTH in the binarizing circuit 9. After passing through a reduction circuit 10 for converting B4 width to A4 width, the converted data are stored, as required, in a line by line fashion in a line buffer memory 11. Address designation is carried out with the output from the address counter 12 and the signal sent from the O/E switching circuit 13. Namely, the data of the first line are stored at an address corresponding to odd numbered data designated by the signal sent from the O/E switching circuit 13. Reading of the data of the first line is thus completed. The data of the second line are stored at an address corresponding to even numbered data designated by the signal sent from the O/E switching circuit 13. The data of the second line are thereby stored at an address where the data of the first line are not stored. Reading of the data of the second line is thus completed.

As explained above, the transmitted lines of data correspond to the lines illustrated in FIG. 5b. The line buffer memory 11 address designation is switched to the AO terminal of the address counter 12 from the O/E switching circuit 13, and data from the line buffer memory 11 is read sequentially, converted by circuit 14 to runlength data, encoded by an encoder 15 and transmitted to the line 17 through a modem 16. The transmitted data combines, in the "alternating" or "zig-zag" pattern described above, the data of two lines. Additional data can be generated by repeating the above-described process.

The signal from the O/E switching circuit 13 is sent in such a manner that the signal for designating the odd number and the signal for designating the even number are transmitted. For example, it is possible that the data of the first line are all stored in the line buffer memory 11 and thereafter only the even number address is updated with the data of the second line. Moreover, it is also possible the transmitting data may be formed by controlling the read operation by the CCD 5 and such transmitting data may be formed in the desired steps.

Figure 2:
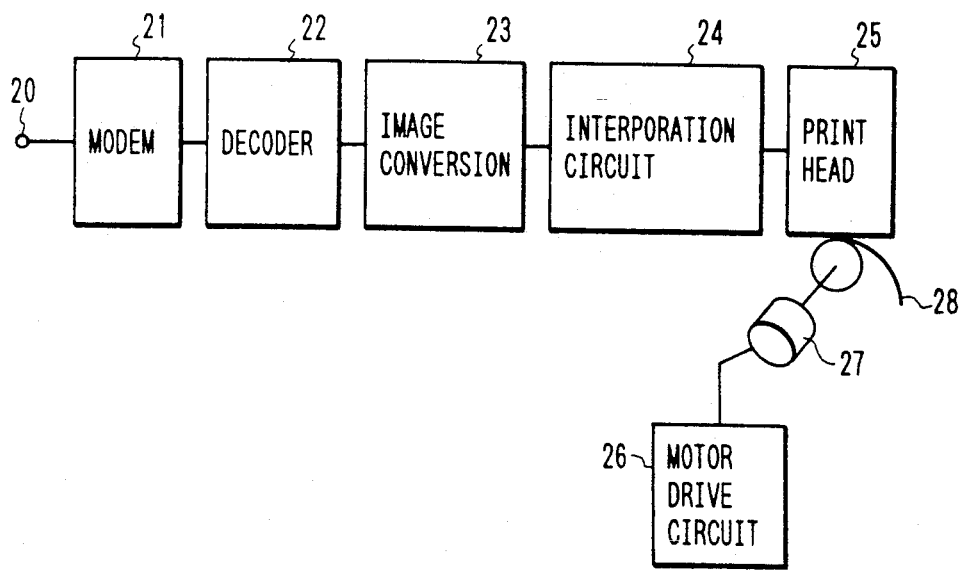
FIG. 2 shows a schematic structural diagram for explaining an embodiment of a facsimile apparatus to which an image output method of the present invention to output an image signal by receiving the signal transmitted in FIG. 1.
Figure 3A:
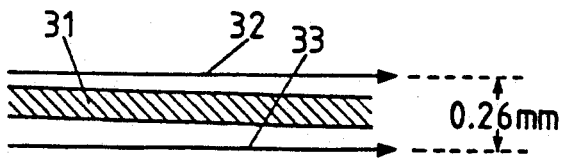
Figure 3B:
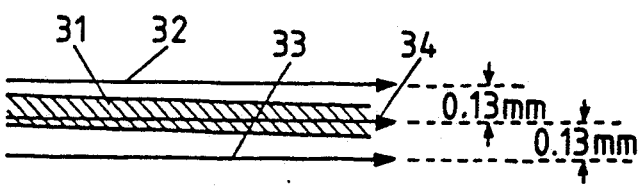
Figure 3C:

FIG. 2 is a schematic structural diagram for explaining an embodiment of a facsimile apparatus in which an image output method in accordance with the present invention is applied. The facsimile apparatus shown in FIG. 2 may output an image signal by receiving the signal transmitted by the device shown in FIG. 1. In FIG. 2, numeral 20 denotes a line; 21 denotes a modem; 22 denotes a decoder; 23 denotes an image converting circuit; 24 denotes an interpolating circuit; 25 denotes a print head; 26 denotes a motor drive circuit; 27 denotes a receiving motor; 28 denotes a recording sheet.

The signal received from the line 20 is input to the decoder 22 via the modem 21 and is converted, line by line, into binary data. The data of each line are accumulated in RAM, stored sequentially from the first pixel data to a pair of line memories with designation of address, and are decomposed to a pair of line data of the even number data and odd number data. Thereafter, the data of the open pixels are interpolated by an interpolation circuit 24. However, for interpolation using data from the four peripheral pixels, the data of at least four lines are stored to use the data of the last line. In the interpolation, the data value of the open pixels may be determined by any appropriate method as, for example, by setting the value to one when both upper and lower pixels are one, or by setting the value to one when both right and left pixels are one, and setting the value to zero in other cases. In addition, it is also possible to use the peripheral data or to introduce a statistical method. However, it is recommended to employ some adequate method, considering the increase of memory capacity and the time required for arithmetic calculation. An interpolation based on the result of a logical OR of the data in both sides may also be realized. Since the interpolation pixels may be inserted only with the data of one line, this method has merit in the memory capacity and time required for arithmetic. The interpolated line data is applied to the printer head 25 and printing is carried out on the recording sheet 28. The recording sheet 28 is subscanned synchronously with the printing by the receiving motor 27 which is driven and controlled by the motor drive circuit 26.

The present invention provides the effect that the fine image input signal can be obtained without increase of quantity of information of the transmitting information and moreover fine image can be output using this signal.

Moreover, the present invention also provides a merit of compatibility because the image input data by the present invention can not only be reproduced by decomposing it into respective lines combined at the time of input as explained above but also be applied in direct to the ordinary output means.

What is claimed is:

1. An input method for an image comprising a plurality of pixels, the pixels having a phase an defining a plurality of pixel lines, the method comprising:
   extracting data from every nth pixel in a pixel line, wherein n is an integer greater than one,
   repeating the extracting step for n pixel lines, wherein the phase of the pixels from which data is extracted is different for each of the n pixel lines, and
   forming a single data line by combining the data extracted from the n pixel lines.

2. A method as in claim 1 wherein n is equal to two.

3. An output method for an image comprising a plurality of pixels, the pixels having a phase and defining a plurality of pixel lines, the method comprising:
   receiving a data line comprising a plurality of pixels,
   extracting data from every nth pixel in the data line, wherein n is an integer greater than one,
   forming a pixel line comprising a plurality of pixels using the data extracted from every nth pixel in the data line,
   performing the extracting and forming steps n times, wherein the phase of the pixels in the data line from which data is extracted is different for each of the n times.

4. A method as in claim 3, wherein the step of forming a pixel line further comprises the step of interpolating data for at least one of the pixels in the pixel line using the data extracted from every nth pixel in the data line.

5. A method as in claim 3 wherein n is equal to two.

* * * * *